United States Patent
Carlotti et al.

(10) Patent No.: US 10,947,344 B2
(45) Date of Patent: Mar. 16, 2021

(54) ROUTE FOR THE SYNTHESIS OF STATISTICAL, ALIPHATIC-AROMATIC COPOLYAMIDES, AND THE RESULTING STATISTICAL, ALIPHATIC-AROMATIC COPOLYAMIDES

(71) Applicants: UNIVERSITÉ DE BORDEAUX, Bordeaux (FR); INSTITUT POLYTECHNIQUE DE BORDEAUX, Talence (FR); Centre national de la recherche scientifique, Paris (FR)

(72) Inventors: Stéphane Carlotti, Pessac (FR); Camille Bakkali-Hassani, Bordeaux (FR); Kévin Roos, Clermont-Ferrand (FR); Mikael Planes, Pessac (FR)

(73) Assignees: UNIVERSITÉ DE BORDEAUX, Bordeaux (FR); INSTITUT POLYTECHNIQUE DE BORDEAUX, Talence (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 16/335,049

(22) PCT Filed: Oct. 13, 2017

(86) PCT No.: PCT/EP2017/076226
§ 371 (c)(1),
(2) Date: Mar. 20, 2019

(87) PCT Pub. No.: WO2018/069515
PCT Pub. Date: Apr. 19, 2018

(65) Prior Publication Data
US 2019/0276604 A1    Sep. 12, 2019

(30) Foreign Application Priority Data

Oct. 13, 2016  (FR) ...................................... 1659918

(51) Int. Cl.
| | | |
|---|---|---|
| *C08L 77/00* | (2006.01) | |
| *C08G 69/18* | (2006.01) | |
| *C08G 69/12* | (2006.01) | |
| *C08G 69/28* | (2006.01) | |
| *C08L 77/02* | (2006.01) | |

(52) U.S. Cl.
CPC ............. *C08G 69/18* (2013.01); *C08G 69/12* (2013.01); *C08G 69/28* (2013.01); *C08L 77/00* (2013.01); *C08L 77/02* (2013.01)

(58) Field of Classification Search
CPC ......... C08L 77/00; C08L 77/02; C08G 69/14; C08G 63/78; C08G 69/28
See application file for complete search history.

(56) References Cited

U.S. PATENT DOCUMENTS 4,131,591 A * 12/1978 MacFarlane, Jr. ...... C08K 13/04
523/213
5,369,171 A * 11/1994 Mulhaupt ............... C08L 23/02
525/66

OTHER PUBLICATIONS

Deniz Tunc: "Synthesis of functionalized polyamide 6 by anionic ring-opening polymerization", Oct. 30, 2014 (Oct. 30, 2014), XP055386385, Retrieved from the Internet: URL:https://tel.archives-ouvertes.fr/tel-0 1281327/document [retrieved on Jun. 29, 2017] cited in the application Chapitre IV; p. 181—p. 221.
Lon J. Mathias et al: "Polymerization of N-(p-aminobenzoyl)caprolactam: Block and alternating copolymers of aromatic and aliphatic polyamides", Journal of Polymer Science, Part A: Polymer Chemistry, vol. 25, No. 10, Oct. 1, 1987 (Oct. 1, 1987), pp. 2699-2709, XP055386404, ISSN: 0887-624X, DOI: 10.1002/pola.1987.080251006 cited in the application figures 1-5, 7, 8 p. 2702-p. 2708.
Yifan Wang et al: "Melt polymerized aramid/polycaprolactam copolymer and its fiber", Polymer International, vol. 63, No. 4, Aug. 6, 2013 (Aug. 6, 2013) , pp. 727-732, XP055106333, ISSN: 0959-8103, DOI: 10.1002/pi.4579 schema 1 figure 8 p. 729-p. 730.
Carlotti et al. In "Anionic polymerization: Principles, practice, strength, consequences and applications ", Springer of Japan, 191-305 (2015).
Stehlicek et al., Eur. Pol. J., 1997, 33, 587-593.
Written Opinion of the International Searching Authority for PCT/EP2017/076226, dated Jan. 24, 2018.
International Search Report for PCT/EP2017/076226, dated Jan. 24, 2018.
Preliminary Search Report for FR1659918, dated Jun. 29, 2017.

* cited by examiner

*Primary Examiner* — Gregory Listvoyb
(74) *Attorney, Agent, or Firm* — B. Aaron Schulman, Esq.; Stites & Harbison, PLLC

(57) ABSTRACT

The present invention relates to a novel synthesis route that can be used to access novel statistical, aliphatic-aromatic copolyamides, by means of ring-opening polymerisation and chain-growth polycondensation, as well as to the resulting copolymers.

6 Claims, No Drawings

ROUTE FOR THE SYNTHESIS OF STATISTICAL, ALIPHATIC-AROMATIC COPOLYAMIDES, AND THE RESULTING STATISTICAL, ALIPHATIC-AROMATIC COPOLYAMIDES

TECHNICAL FIELD

The present invention relates to thermoplastic polyamides. Polyamides, and in particular nylon 6, are widely used in varied sectors on account of their mechanical properties, for example as matrices for thermoplastic composites in the automotive sector.

It is desirable to increase the service temperature of polyamide-6. To achieve this, it has been envisaged to modify the chain of repeating units. In particular, the insertion of aromatic units would allow an increase in the service temperature of the polyamide. Aromatic units allow the reducing of polymer chain mobility, and thereby increase the glass transition temperature.

Polyamide 6 is generally synthesized via two different pathways: either hydrolytic polymerization or anionic polymerization, both based on opening of the ε-caprolactam ring. Anionic polymerization has the advantage that it is possible to conduct polymerization at a lower temperature and hence limit secondary reactions, and in addition the initial very low viscosity of the mixture allows the association of numerous production methods such as vacuum infusion.

Carlotti et al. in "Anionic polymerization: Principles, practice, strength, consequences and applications", Springer of Japan, 191-305 (2015), describes polyamide synthesis via anionic polymerization. The polymerization of PA6 is therefore performed using an ε-caprolactam monomer, in the presence of an activator (N-acyllactam) and an initiator (sodium ε-caprolactam). The insertion of aromatic repeating units is not envisaged however.

Stehlicek et al., Eur. Pol. J., 1997, 33, 587-593 describes the insertion in PA6 of a short, central aromatic sequence. However, the described process leads to the formation of triblock copolymers with a central core of aramid type, using complex initiators.

Mathias et al., J. Polymer Science, Part A, vol. 25, 2699-2709 (1987) describes a method which necessarily leads to the formation of block copolymers having sequences of aromatic repeating units and aliphatic repeating units, or alternating, via the synthesis of a particular monomer. Nevertheless, the methods described by the authors do not allow the obtaining of statistical copolymers in which the aromatic units are inserted and statistically distributed within the aliphatic sequence.

A statistical copolymer has the advantage over block copolymers of being prepared in a single step, of obtaining a homogeneous system and averaging out properties.

It is therefore desirable to make available a novel method for preparing aliphatic-aromatic copolyamides of statistical type, allowing the distribution of aromatic units within the aliphatic polyamide.

In a thesis by D. Tunc (Tunc "Synthesis of functionalized polyamide 6 by anionic ring-opening polymerization", March 2016) a method is described combining polymerization via ring-opening and chain-growth polycondensation, using ε-caprolactam and ethyl 4-butylaminobenzoate as aromatic monomer.

However, the aromatic PA6s obtained have a glass transition temperature (Tg) lower than 70° C. with aromatic contents that are too high for the envisaged industrial applications. An increase in aromatic content increases the overall cost of the method on account of the additional costs of raw materials and decreased rate of copolymerization.

In addition, the author indicates that the alkylated derivatives of ethyl aminobenzoate are preferred as monomer.

Having regard to industrial requirements, it therefore remains necessary to provide a method giving access to high Tg values with low aromatic contents.

The method of the invention combines anionic polymerization via ring-opening with chain-growth polycondensation using a novel aromatic monomer, allowing high Tg values to be obtained together with aromatic contents compatible with criteria of industrial cost.

The aliphatic aromatic polyamides thus synthesized are novel and represent a further subject of the present invention.

A first subject of the invention is therefore a method for preparing an aliphatic-aromatic copolyamide of formula (I):

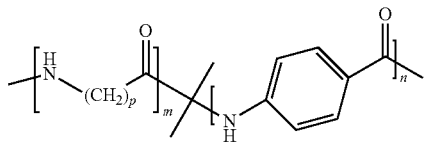

where:
p is an integer of between 5 and 11;
n is the number average in number of aromatic units;
and m is the number average in number of aliphatic units;
such that the ratio n/(n+m) is between 5 and 50%;
/ represents the statistical distribution of the aliphatic and aromatic units;
said method comprising the reacting of:
a lactam derivative of formula (II):

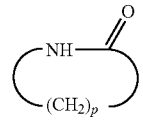

(II)

and/or one of the salts thereof,
where p is defined as in formula (I);
an alkyl 4-aminobenzoate of formula (III):

(III)

either in free form, in which case a strong base is added to the reaction mixture,
or in the form of one of the salts thereof of formula (III'):

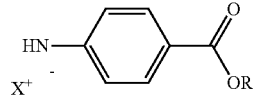

(III')

where in formulas (III) and (III'):
R is a C6-C12 aryl group or C1-C6 alkyl group, linear or branched; and
X⁺ is alkali metal cation or magnesium halide ion (MgHal⁺) or a phosphazenium ion such as alkyl phosphazenium, in particular $^t$BuP4H+);
And
an activator.

With the method of the invention it is possible to increase the Tg values of the polyamides obtained, with an industrially compatible proportion of aromatic units in the copolymer.

Copolymers having less than 50 mole %, even less than 25 mole % of aromatic units can therefore be prepared for Tg values higher than 50° C. The method of the invention therefore allows envisaged access to high Tg values by increasing the aromatic content.

The anionic PA6 has a Tg of 52° C. whilst the aromatic PA6 prepared with the method of the invention has a Tg possibly reaching 75° C. and even 80° C. with an aromatic content of approximately 20%.

In general, the aromatic PA6s obtained with the method of the invention have Tg values in the region of 75° C., even 80° C. with aromatic contents of less than 25%.

The method of the invention can therefore be carried out starting from the same reagents as those usually used for the synthesis of aliphatic polyamide, to which is added an aromatic amine (III) or one of the salts thereof (III') as aromatic comonomer. Cross reaction between the aromatic amine or its salt and the monomer of lactam type takes place via a so-called "activated monomer" mechanism.

According to the Invention by:

"Statistical copolymer" or "statistical distribution" is meant the statistical sequence of the aromatic units within the aliphatic sequences. Statistical distribution generally gives a single Tg for a given copolymer.

"Block copolymer" is meant a copolymer formed of an aliphatic block and an aromatic block.

"Alkali metal cation" is meant the salts Li⁺, Na⁺, K⁺.

"Tg" is meant the glass transition temperature of a polymer i.e. the temperature at which the polymer changes from a solid glass state to a rubbery state. It is generally measured by thermal analysis such as differential scanning calorimetry (DSC). It can be measured in particular using apparatus such as Perkin-Elmer Diamond DSC, or TA Instruments DSC Q100 LN2 by varying the temperature, for example between −20 and 40° C. at a rate of typically between 5 and 20° C. min⁻¹, for example in the region of 10° C. min⁻¹.

p is preferably 5 or 11.

The ratio n/(m+n) can particularly lie between 10 and 40%.

The percentages given here are generally molar percentages unless otherwise indicated.

"C1-C6 alkyl" is meant methyl, ethyl, propyl, butyl, pentyl, hexyl groups, and the corresponding iso- and tert-isomers.

"C6-C12" aryl is meant aromatic groups having 6 carbon atoms such as the phenyl and naphthyl groups.

"Activator" is meant any activator generally used for polyamide synthesis via ring-opening. As activator suitable for the invention, particular mention can be made of the compounds of acyllactam type e.g. N-acyllactam of formula (IV):

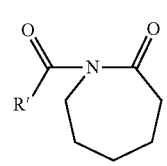

(IV)

where R' is a linear or branched C1-C6 alkyl group, or C6-C12 aryl group, optionally substituted by a carbamoylcaprolactam group such as N,N'-hexamethylenebis(2-oxo-1-azepanylcarboxamide) or hexamethylene-1,6-dicarbamoylcaprolactam.

For illustration, as commercially available activator mention can be made of the activators in the BRUGGOLEN® range marketed by Bruggeman, in particular BRUGGOLEN® C20P.

The method of the invention is achieved through the active form of amine (III) i.e. the salt of alkyl 4-aminobenzoate (III').

The method can therefore be conducted:
either from alkyl 4-aminobenzoate of formula (III) and the strong base, the salt being formed in situ and directly engaged in the reaction; in particular the two monomers II and III can be engaged in the molten state allowing a solvent-free method;
or from the salt as starting product, on the understanding that this salt can be previously formed by deprotonating the free form of the corresponding amine of formula (III) via the action of a strong base.

For example, in to one embodiment, when the reaction is conducted from alkyl 4-aminobenzoate (III) in free form, the salt (III') is formed in situ via action of the alkyl 4-aminobenzoate with said strong base.

In general, it is preferable that at least 10% of (III') salt relative to the free form (III) should be formed and engaged in the reaction.

In another embodiment, when the reaction is conducted from the salt of alkyl 4-aminobenzoate (III'), the method may additionally comprise the previous step of prior formation of the salt from alkyl 4-aminobenzoate (III) and said strong base.

The salt thus formed can be directly engaged in the reaction with the lactam derivative (II) and the activator, or it can be isolated and/or purified intermediately before conducting said reaction.

In one or other of the embodiments, the deprotonating step of compound (III) by said strong base is preferably performed in a non-protic polar solvent.

As solvent, particular mention can be made of tetrahydrofuran (THF), diethylether, dimethylsulfoxide (DMSO), dimethylformamide (DMF), acetonitrile.

In general, THF is preferred. In this case, the strong base can also be added in solid form (depending on the type of strong base employed).

In one embodiment, the polymerization reaction can be conducted from compound (II) in free form.

In can also use the salt of lactam (II). The lactam salt of formula (II) meets formula (II'):

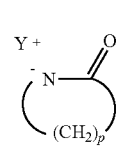

(II')

where p is defined as in claim 1, and $Y^+$ is an alkali metal cation, or magnesium halide ion (MgHal$^+$) or a phosphazenium ion (such as alkyl phosphazenium in particular $^t$BuP4H$^+$, on the understanding that $Y^+$ can equal $X^+$.

This salt, which acts as initiator, is generally formed in situ in the presence of compound (II) and salt (III') and/or of residues of the strong base contained in the reaction mixture or contained in the salt (III') when the latter is engaged as such without prior purification.

This salt can also be added to the reaction mixture comprising said lactam (III), to promote the copolymerization reaction.

When p=5, compound (II) is called εcaprolactam and its salt (II') is εcaprolactamate. When p=11, compound (II) is called omega-lauryllactam, the salt (II') being called omega-lauryllactamate.

In one embodiment, in general formula (III) or (III'), R is an ethyl group.

In one embodiment, the strong base is selected from among bases having a pKa of 25 or higher. As base suitable for the method of the invention, particular mention can be made of: NaHMDS, LiHMDS, alkylmagnesians, alkyllithiums, alkali metal hydrides, more particularly NaHMDS, LiHMDS.

In general, the polymerization reaction is conducted using 10 to 50 mole %, in particular 10 to 40 mole % of compound (III') relative to the monomer (II).

The base is generally used in stoichiometric amount relative to compound (III). This amount can be lower however, in particular as low as 10 mole % relative to compound (III).

The method of the invention notably provides access to the aliphatic aromatic copolyamide of formula (I')

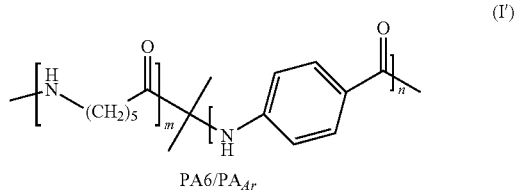

PA6/PA$_{Ar}$ where, in formulas (I) and (II), p=5, and where m and n are defined as in formula (I); and to compound (I''):

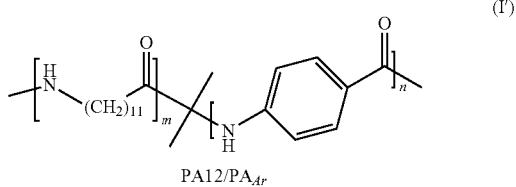

PA12/PA$_{Ar}$ where, in formulas (I) and (II,) p=11 and where m and n are defined as in formula (I).

In one embodiment, the copolyamide PA6/PA$_{Ar}$ of the invention generally has a glass transition temperature Tg of between 50° C. and 75° C., even 80° C. with an aromatic content of less than 20 mole %.

In one embodiment, the method of the invention comprises bulk conducting of the polymerization reaction i.e. without a polymerization solvent.

It is to be understood however that when the reaction is conducted from compound (III) in free form, without an isolation step of the intermediately formed salt (III'), the reaction mixture may then contain the solvent of the deprotonating step.

In general, the solvent can be removed by the high temperature of the reaction mixture, e.g. by leaving the reactor open for a few seconds/minutes under a stream of inert gas.

In one embodiment, the polymerization reaction is conducted at a temperature higher than the melt temperature of compound (II) i.e. generally between 85° C. and 200° C., more particularly between 130° C. and 180° C., typically between 130° C. and 150° C. when p=5 (synthesis of aromatic PA6) or between 150° C. and 180° C. when p=11 (synthesis of aromatic PA12).

A further subject of the invention is the statistical aliphatic-aromatic copolyamide of formula (I):

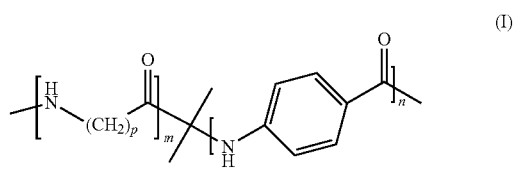

where:

p is an integer of between 5 and 11;

n is the number average in number of aromatic units;

and m is the number average in number of aliphatic units;

such that the ratio n/(n+m) is between 5 and 50%;

/ represents the statistical sequence of the aliphatic and aromatic units.

p is preferably 5 or 11.

In general m is between 0.5 and 0.95.

In general n is between 0.05 and 0.5.

In general, the dispersity of the copolymers (I) is between 2 and 3.

The number average molecular weight (Mn) is generally between 2 000 and 1 000 000 g/mol, preferably between 10 000 and 300 000 g/mol. This can typically be determined by size exclusion chromatography e.g. in hexafluoroisopropanol (HFIP).

As an illustration, measurements in HFIP can be performed using an integrated PL GPC50 system equipped with infra-red and UV (280 nm) and two PL HFIP gel columns 300×7.5 mm) (with exclusion limits of 100 Da to 1 500 000 Da) at a rate of 1 mL/min using PMMA standards, the temperature of the columns being maintained at 40° C.

The molecular weight can be adapted to the sought-after properties and targeted utilizations.

The Tg values of the aliphatic-aromatic copolyamides of the invention can be between 50° C. and 90° C., in particular 50-80° C., more particularly 50-75° C.

For example, in one embodiment, the invention particularly concerns the statistical aliphatic-aromatic copolyamide of formula (I) meeting formula (I'):

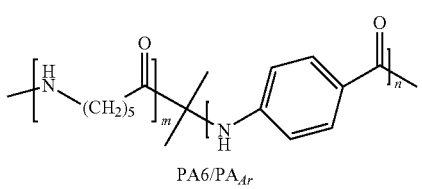

(I')

PA6/PA$_{Ar}$ where, in formulas (I) and (II), p=5 and where m and n are defined as in formula (I);

or meeting formula (I"):

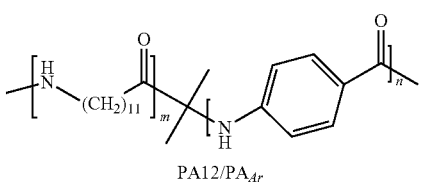

(I')

PA12/PA$_{Ar}$ where m and n are defined as in formula (I).

The PA6/PA$_{Ar}$ of the invention generally has a Tg of between 50° C. and 75° C., in particular for an aromatic content of less than 20%.

A further subject of the invention concerns thermoplastic composites comprising a copolymer of the invention as polyamide.

The invention therefore also concerns automotive parts comprising said composite.

The following examples are given as nonlimiting illustrations of the present invention:

EXAMPLES

ε-caprolactam (CL) (BASF, 99%) was recrystallized from dry cyclohexane before use. The Brüggolen® C20 activator (17 weight % isocyanate in CL, N, N'-hexamethylenebis(2-oxo-1-azepanylcarboxamide) or hexamethylene-1-6-dicarbamoylcaprolactam in CL, Brüggeman Chemical) was used as supplied. The ethyl 4-aminobenzoate (98% Aldrich) was dried by azeotropic distillation with toluene (99.9% Aldrich) and vacuum dried for 12 h. Tetrahydrofuran THF 99.9% Aldrich) was dried over sodium/benzophenone then distilled before use. The toluene was dried over CaH$_2$, refluxed overnight, distilled and stored on polystyryllithium. Sodium bis(trimethylsilyl)amide (NaHMDS, 1.0 M in THF) was purchased from Sigma-Aldrich and used as supplied. NaHMDS can also be used in powder form (95% Aldrich) diluted in THF.

Example 1: Copolymerization from the Aromatic Monomer Salt (III') with Prior Synthesis of the Salt from the Aromatic Monomer in Free Form (III)

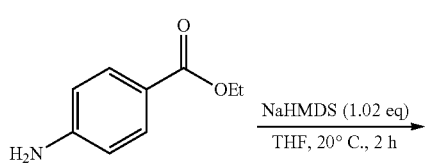

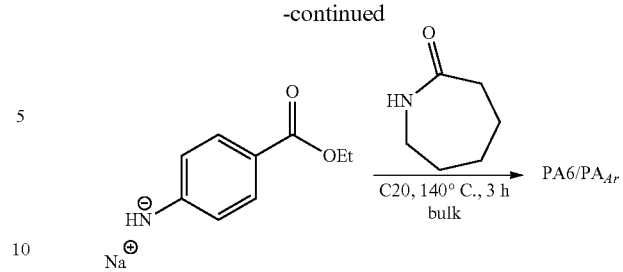

Synthesis of the Activated Monomer:

Ethyl 4-aminobenzoate (5.00 g; 29.55 mol) was dried with 3 dry toluene azeotropes (3*20 ml). A Schlenk tube, vacuum flame-dried and equipped with a magnetic stir bar, was charged under argon (or nitrogen) with 2.0 g (12.1 mmol) of ethyl 4-aminobenzoate subsequently solubilized in THF (10 ml). The solution was cooled to 0° C. before adding 12.5 ml of NaHMDS solution (1M) in THF. The mixture was left under agitation at 25° C. for 1 to 2 h. The mixture was used as such for copolymerization.

Polymerization Protocol:

A reactor containing a magnetic stir bar and purged under argon (or nitrogen) at 140° C. was charged with 1.00 g (6.06 mmol) of activated monomer in 4 ml of dry THF. The mixture was held at 140° C. under a stream of argon (or nitrogen) until complete evaporation of the solvent, after which ε-caprolactam (CL 6.16 g, 54.55 mmol) was added under stream of argon. The mixture was left under agitation for 5-10 minutes until complete melting of ε-caprolactam. The C20 activator (17% w/w of isocyanate in CL, N,N' hexamethylenebis(2-oxo-1-azepanylcarboxamide) or hexamethylene-1,6-dicarbamoylcaprolactam in CL, Brüggemann Chemical) (415 mg; 0.180 mol) was then added under a stream of argon (or nitrogen) and the mixture held at 140° C. for 40 min.

The solid obtained was precipitated 3 times in THF (m=6.85 g, Yd.=90%). Targeted Mn=20 000 g·mol$^{-1}$.

The same protocol was followed to prepare a copolymer having 25% aromatic content (by changing the molar ratios III' and II).

The products obtained were analysed by NMR and exhibited the following aromatic contents:

| Example | % Aromatic (theoretical) | % Aromatic (1H NMR) |
| --- | --- | --- |
| 1A | 10 | 11 |
| 1B | 25 | 16 |

Example 2: Properties of the Aromatic PA6s Obtained

The copolymers obtained in Example 1 were analysed by DSC. Measurements by differential scanning calorimetry (DSC) of the PA6 samples (about 10 mg) were taken with TA instrument DSC Q100 LN2, at a heating/cooling rate of 10° C./min for temperatures of between −20° C. and 250° C. under a stream of nitrogen (10 mL/min) using aluminium pans. The results were collected on and after the second pass which led to Tg values evaluated as from the inflection point of the heat capacity step change.

The results obtained are summarized in the table below:

| Example | Aromatic content | Tg (° C.) | ΔHf (J/g) | Tf (° C.) |
|---|---|---|---|---|
| 1A | 11% | 69 | 51.0 | 192.0 |
| 1B | 16% | 72 | 34.0 | 192.4 |

As comparative example, Example 1 was reproduced replacing ethyl 4-aminobenzoate by ethyl 4-butylaminobenzoate as aromatic monomer, applying the method described by Tunc "Synthesis of functionalized polyamide 6 by anionic ring-opening polymerization", March 2016. The following results were obtained:

| Example | Aromatic content | Tg (° C.) | ΔHf (J/g) | Tf (° C.) |
|---|---|---|---|---|
| Comparative | 25% | 48 | 22.2 | 177 |

These results show that the use of ethyl 4-aminobenzoate allows an improvement in synthesis compared with ethyl 4-butylaminobenzoate in that higher Tg values are obtained with lower aromatic contents.

Example 3: Copolymerization from the Aromatic Monomer (Ill) with In Situ Synthesis of the Salt

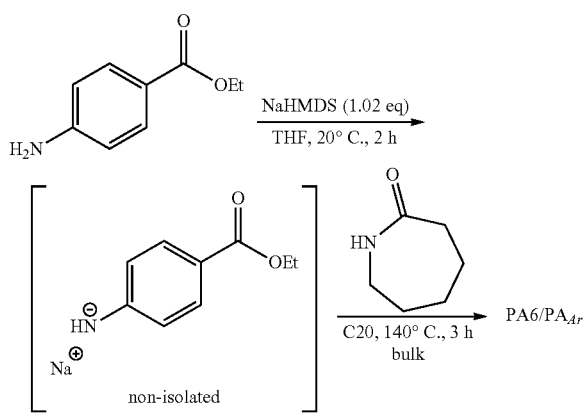

Ethyl 4-aminobenzoate (5.00 g; 29.55 mmol) was dried with 3 dry toluene azeotropes (3*20 ml) then solubilized in dry THF (20 ml).

Deprotonation/Polymerization Protocol

A reactor containing a magnetic stir bar and purged under argon (or nitrogen) was charged with 1.00 g (6.05 mmol) of aromatic monomer in 4 ml of dry THF, NaHMDS (1M; 6.1 ml) then εcaprolactam (6.16 g; 54.45 mmol) under a stream of argon (or nitrogen). The mixture was rapidly brought to 140° C. under a stream of argon (or nitrogen). The C20 activator (415 mg; 0.180 mmol) was then added under a stream of argon (or nitrogen) and the mixture held at 140° C. for 40 min.

The solid obtained was precipitated 3 times in THF (m=6.85 g, Yd.=90%) for 10% aromatic content (theoretical).

The same protocol was followed to prepare a copolymer having 25% aromatic content (by changing the molar ratios III' and II):

| Copolymer | Aliphatic/aromatic composition ($^1$H NMR) | Tg (° C.) | Tm (° C.) | ΔHm (J · g$^{-1}$) |
|---|---|---|---|---|
| 25% | 75:25 | 75.0 | 175 | 42.0 |

Example 4: Copolymerization from the Mixture of Monomers (III and II) in the Molten State with In Situ Generation of the Salt Ethyl 4-aminobenzoate (5.00 g; 29.55 mmol) was dried with 3 dry toluene azeotropes (3*20 ml) and used directly in powder form.

Deprotonation/Polymerization Protocol

A reactor previously heated to 140° C. containing a magnetic stir bar and purged under argon (or nitrogen) was charged with 1.00 g (6.05 mmol) of aromatic monomer followed by εcaprolactam (6.16 g, 54.45 mmol) under a stream of argon (or nitrogen). After complete melting of both reagents, NaHMDS (6.05 mmol) was added under a stream of argon (or nitrogen). The C20 activator (415 mg; 0.180 mmol) was next added under a stream of argon (or nitrogen) and the mixture held at 140° C. for 40 min.

The solid obtained was precipitated 3 times in THF (m=6.85 g, Yd.=90%) for 10% aromatic content (theoretical).

The same protocol was followed to prepare a copolymer having 5 to 20% aromatic content (by changing the molar ratios III' and II).

| Copolymer | Aliphatic/aromatic composition ($^1$H NMR) | Tg (° C.) | Tm (° C.) | ΔHm (J · g$^{-1}$) |
|---|---|---|---|---|
| 5% | 93:7 | 63.0 | 208 | 88.1 |
| 10% | 83:17 | 79.0 | 191 | 78.6 |

The invention claimed is:

1. Method for preparing an aliphatic-aromatic copolyamide of formula (I):

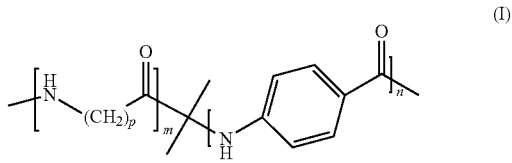

where:

p is an integer of between 5 and 11;

n is the number average in number of aromatic units;

And m is the number average in number of aliphatic units;

Such that the ratio n/(n+m) is between 5 and 50%;

/represents the statistical sequence of the aliphatic and aromatic units, said method comprising the reacting of:

A lactam derivative of formula (II):

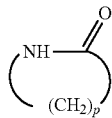

(II)

and/or one of the salts thereof,
where p is defined as in formula (I);
An alkyl 4-aminobenzoate of formula (III):

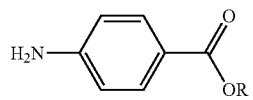

(III)

either in free form, in which case a strong base is added to the reaction mixture, or in the form of one of the salts thereof of formula (III'):

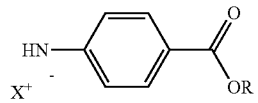

(III')

where:
R is a linear or branched C1-C6 alkyl group; and
$X^+$ is an alkali metal cation, or magnesium halide ion (MgHal$^+$), or a phosphazenium ion (such as alkyl phosphazenium, in particular $^t$BuP4H+);
And:
An activator.

2. The method according to claim 1, such that when the reaction is conducted from alkyl 4-aminobenzoate (III) in free form, the salt (III') is formed in situ via action of alkyl 4-aminobenzoate (III) with said strong acid.

3. The method according to claim 1, such that it is conducted from compounds (II) and (III) in the molten state, without solvent.

4. The method according to claim 2, such that at least 10% of salt (III') relative to the free form (III) is formed and engaged in the reaction.

5. The method according to claim 1, such that when the reaction is conducted from the salt of alkyl 4-aminobenzoate (III'), the method additionally comprises the previous step of prior preparation of said salt from alkyl 4-aminobenzoate (III) and said strong base.

6. The method according to claim 1 wherein the compound of formula (I) meets formula (I'):

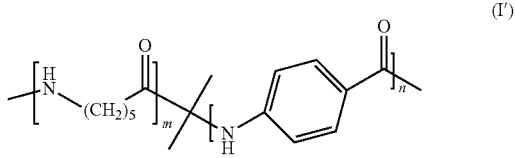

PA6/PA$_{Ar}$ or meets formula (I"):

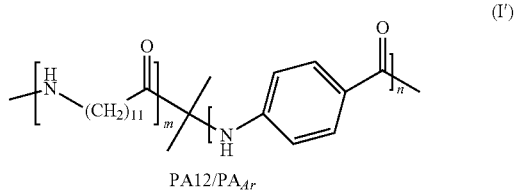

PA12/PA$_{Ar}$

* * * * *